March 1, 1927.

F. LESCARTS 1,618,987

VARIABLE SPEED GEAR

Filed Dec. 12, 1925

Inventor.
Fernand Lescarts.
per [signature]
Attorney.

Patented Mar. 1, 1927.

1,618,987

UNITED STATES PATENT OFFICE.

FERNAND LESCARTS, OF BRUSSELS, BELGIUM.

VARIABLE SPEED GEAR.

Application filed December 12, 1925, Serial No. 75,118, and in Belgium July 22, 1925.

The present invention relates to power transmitting means adapted gradually to vary the speed of a driven shaft relatively to that of the driving shaft, and it has for its object to provide a variable speed gear adapted to be adjusted so as automatically to proportion the speed of the driven shaft in reverse relation to the resistance to its rotation.

The variable speed gear according to my invention comprises an intermittently acting clutch which successively couples and uncouples the driving and driven shafts a certain number of times during each revolution of the driving shaft, the speed of the driven shaft varying in reverse relation to the number of coupling and uncoupling operations occurring during one revolution of the driving shaft. The intermittent action of this clutch is produced by means of cams rotated by the driving shaft and arranged so that the speed variations of the driven shaft may be controlled at will and automatically adjust themselves to the load applied to that shaft at any particular time.

The clutch preferably comprises coupling discs respectively connected to the driving shaft and to the driven shaft, and the cams may be rigidly connected with the planet wheels of a differential gear having its sun wheels respectively secured to the driving and driven shafts, and its cross-shaft free to rotate on and slide along the common axis of said shafts. Preferably two cams are provided comprising each a circular plate having on its periphery two diametrically opposite projections adapted simultaneously to engage on one side the outermost coupling disc of the clutch and on an axially adjustable ring whereby the pressure exerted by the cams on the coupling discs may be increased or decreased at will.

The number of successive couplings per revolution of the driving shaft and, consequently, the relative speed of the driven shaft are dependent both on the resistance to the rotation of the cams when they are clamped between the discs and the adjustable ring, and on the resistance to the rotation of the driven shaft. When these two resistances balance each other the driven shaft rotates at the same speed as the driving shaft.

Figure 1:
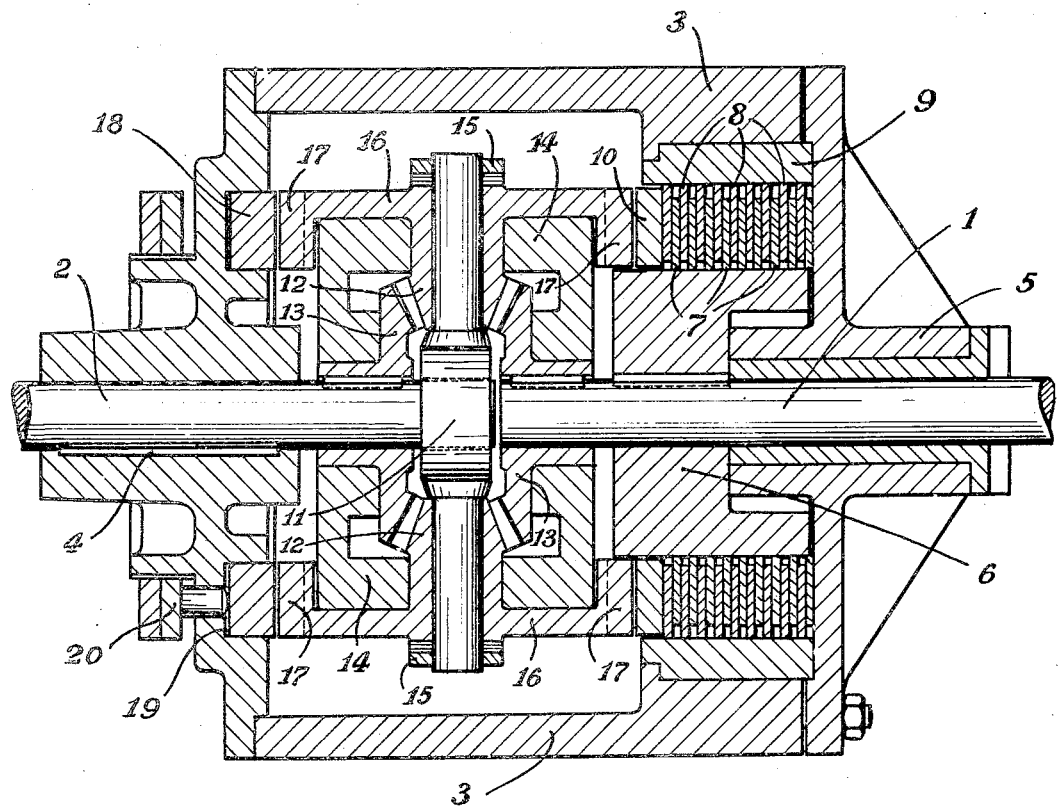
Figure 2:
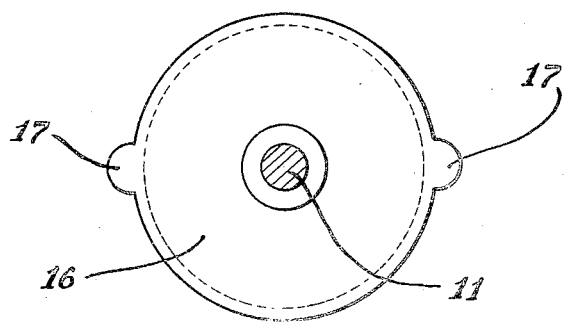

In the accompanying drawing which illustrates by way of example an embodiment of my invention, Fig. 1 diagrammatically shows the same in longitudinal section and Fig. 2 is a front view of a cam plate.

In the drawing 1 is the driving shaft, 2 the driven shaft in alignment therewith and 3 a casing rigidly connected to the shaft 2 by means of a key 4 and provided with a bearing 5 in which the shaft 1 is rotatably supported. Upon the driving shaft 1 is keyed a hub 6 of polygonal cross-section on which are slidably fitted a series of loose discs 7 alternating with similar discs 8 likewise fitted in a member 9 secured to the casing 3. The discs 7 and 8 may be pressed against each other by means of a ring 10 and thus form a friction clutch enabling the driving shaft 1 to impart its movement of rotation to the casing 3 and consequently to the shaft 2.

On the end of one of the shafts 1, 2 is freely mounted a cross-shaft 11 carrying the two conical planet wheels 12, 12 of a differential gear whose sun wheels 13, 13 are respectively keyed on the driving shaft 1 and the driven shaft 2. The conical wheels 12, 12 and 13, 13 are mounted in an inner casing 14 which can freely rotate about the common axis of the shafts 1 and 2, and the wheels 12 are kept in position on the shaft 11 by means of nuts 15 pinned on said shaft. Rigidly connected to each pinion 12 is a cam 16 in the shape of a circular plate having two diametrically opposite projections 17, 17 (Fig. 2) adapted simultaneously to engage the ring 10 of the clutch and an axially slidable ring 18 mounted in an annular recess 19 of the casing 3.

By means of an operating member acted upon by suitable controlling means and diagrammatically shown at 20, the position of the ring 18 may be adjusted towards or away from the clutch ring 10, so as to vary both the pressure exerted on the clutch discs 7, 8 by the cam projections 17, 17 as they engage the rings 10 and 18, and the friction of said projections on these rings.

When the ring 18 is so adjusted that this pressure is sufficient to clamp the cam plates 16 between the rings 10 and 18 and keep the clutch discs 7, 8 in frictional engagement, the shaft 1 rotates the shaft 2 through both the clutch discs and the differential gear as if all these elements were integral with each other. If however the load on the shaft 2 is to high, the discs 7 will slip on the discs 8 and at the same time by reason of the difference in speed between the shafts 1 and 2, the planet wheels 12 are set in motion about their axis and with them the cam plates 16 are rotated and cease to press on the clutch discs. The coupling is temporarily released and the shaft 2 is freed from the shaft 1 until, after having turned through half a revolution, the cam plates 16 are again clamped between the rings 10 and 18 and the shafts 1 and 2 are once more coupled together. If the clutch slips again the cam plates continue to rotate thus successively coupling and uncoupling the two shafts. Through this succession of coupling and uncoupling operations the shaft 1 will continue to drive the shaft 2 in spite of the load thereon, but at a lesser speed, such speed automatically varying in reverse relation to the load on the shaft 2 for a given adjustment of the ring 18. By varying the adjustment of ring 18 it is also possible to vary at will the speed of the driven shaft relatively to that of the driving shaft for a given load on the driven shaft. No undue heating of the clutch members can take place since, as soon as the discs 7 begin to slip, the cam plates 16 cease pressing on them and the discs 7 and 8 move slightly apart by reason of their elasticity.

This variable speed gear is applicable to all mechanisms in which a reduction or a modification of the speed of the driving shaft is required. It is of course understood that the particular construction described and illustrated is only one of the forms in which the invention may be embodied and that changes may be made therein without departing from the scope of my invention.

I claim:

1. In a variable speed gear, the combination of a driving shaft, a driven shaft, a friction clutch for coupling said shafts together, differential means operated by said shafts, and means actuated by said differential means for automatically controlling the operation of said clutch.

2. In a variable speed gear, the combination of a driving shaft, a driven shaft, a friction clutch for coupling said shafts together, differential means operated by said shafts, means actuated by said differential means for successively operating and releasing said clutch at a frequency depending on the load on the driven shaft, and means for varying said frequency.

3. In a variable speed gear, the combination of a driving shaft, a driven shaft in alignment therewith, a differential gear having sun wheels rotated by said shafts respectively and loosely mounted planet wheels, cams rotated by said planet wheels and a clutch controlled by said cams for coupling said shafts together.

4. In a variable speed gear, the combination of a driving shaft, a driven shaft, a friction clutch for directly coupling said shafts together, cams for intermittently operating said clutch, and differential means controlled both by said driving and driven shafts for operating said cams.

5. In a variable speed gear, the combination of a driving shaft, a driven shaft, clutch members rotating with each of said shafts, rotary cams for pressing said members together, differential means controlled both by said driving and driven shafts for operating said cams, and means for varying the pressure exerted by said cams on said clutch members.

6. In a variable speed gear, the combination of a driving shaft, a driven shaft in alignment therewith, a casing rigid with one of said shafts, and means within said casing, said means including a differential gear, a frictional clutch and cams rotated by said gear for controlling said clutch coupling said casing with the other of said shafts.

7. In a variable speed gear, the combination of a driving shaft, a driven shaft in alignment therewith, clutch members connected with said driving and driven shafts respectively, one at least of said members being slidable axially of said shafts, a bearing member, a cross-shaft, cam plates loosely mounted on said cross-shaft, said cam plates being comprised between and adapted to engage said clutch and bearing members, bevel pinions rigid with said cams, and bevel wheels engaging said pinions, said bevel wheels being mounted on said driving and driven shafts respectively.

8. In a variable speed gear the combination of a driving shaft, a driven shaft in alignment therewith, a casing rigid with one of said shafts, clutch discs respectively connected with said casing and with the other of said shafts, said discs being slidable axially of said shafts, a bearing ring adjustable towards and away from said discs, a differential casing loosely mounted on and slidable axially of said shafts, a cross-shaft mounted in said differential casing, cam plates loosely mounted on said cross-shaft, said cam plates being comprised between and adapted to engage said clutch discs and bearing ring, and sun and planet wheels in said differential casing, said sun wheels being keyed on said driving and driven shafts respectively, said planet wheels being rigid each with one of said cam plates.

In testimony whereof I affix my signature.

FERNAND LESCARTS.